United States Patent [19]

Savage et al.

[11] 4,263,821
[45] Apr. 28, 1981

[54] CRANK ARM FOR A WINDSHIELD WIPER DRIVE MECHANISM

[75] Inventors: Jack W. Savage, Centerville; Ralph J. Unterborn, Dayton, both of Ohio

[73] Assignee: General Motors Corporation, Detroit, Mich.

[21] Appl. No.: 73,913

[22] Filed: Sep. 10, 1979

[51] Int. Cl.³ .......................... A47L 1/00; F16C 3/04
[52] U.S. Cl. .................. 74/595; 15/250.31;
74/606 R; 74/42; 308/58; 308/240
[58] Field of Search ............ 15/250.12, 250.13, 250.16,
15/250.17, 250.3, 250.31, 250.34; 74/42, 595,
605, 606 R; 308/58, 240

[56] References Cited

U.S. PATENT DOCUMENTS

| 2,827,793 | 3/1958 | Dyer | 15/250.17 X |
|---|---|---|---|
| 3,037,391 | 6/1962 | Bell et al. | 15/250.17 X |
| 3,242,520 | 3/1966 | Carroll et al. | 15/250.17 |
| 3,253,206 | 5/1966 | Romanowski | 15/250.17 X |
| 3,445,145 | 5/1969 | Carroll et al. | 15/250.17 X |
| 3,588,940 | 6/1971 | Mainka et al. | 15/250.17 |

Primary Examiner—Lawrence J. Staab
Attorney, Agent, or Firm—Donald F. Scherer

[57] ABSTRACT

A windshield wiper drive mechanism includes an electric motor having a worm shaft which meshes with a gear assembly which is drivingly connected to a crank arm. A windshield wiper transmission link is also connected to the crank arm. The crank arm has an inner diametral bearing surface which is rotatably supported on a pin secured at one end in cantilever fashion to a housing, and an outer diametral bearing surface which is adapted for rotatable support in a cylindrical opening in another housing. The outer bearing surface has axially extending recesses in which a lubricant is retained. When high transmission loads are applied to the crank arm, the pin deflects slightly so that the increased bearing loads are supported on the outer bearing surface to prevent further deflection of the pin.

3 Claims, 5 Drawing Figures

CRANK ARM FOR A WINDSHIELD WIPER DRIVE MECHANISM

This invention relates to crank arm bearing support surfaces and more particularly to crank arm bearings having both inner and outer rotational bearing support surfaces.

It is an object of this invention to provide an improved windshield wiper crank arm having a pair of concentric bearing surfaces which are adapted to rotate on a pin member and within a housing, respectively.

It is another object of this invention to provide an improved windshield wiper crank arm and support wherein a pin member is secured in cantilever fashion to provide primary rotary support for a crank arm with a gear drive connected thereto and wherein the crank arm has an outer bearing surface which, upon deflection of the pin member, will be brought into bearing relationship with a cylindrical opening in a housing thereby providing secondary bearing support and preventing further deflection of the pin member.

These and other objects and advantages of the present invention will be more apparent from the following description and drawings in which.

Figure 1:
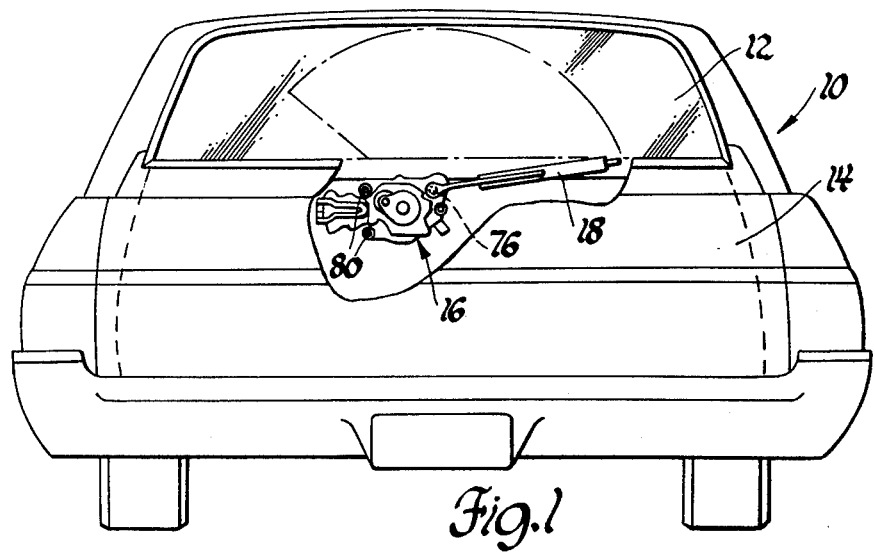
FIG. 1 is a rear elevational view of an automotive vehicle showing the location of a windshield wiper assembly incorporating the present invention.
Figure 2:
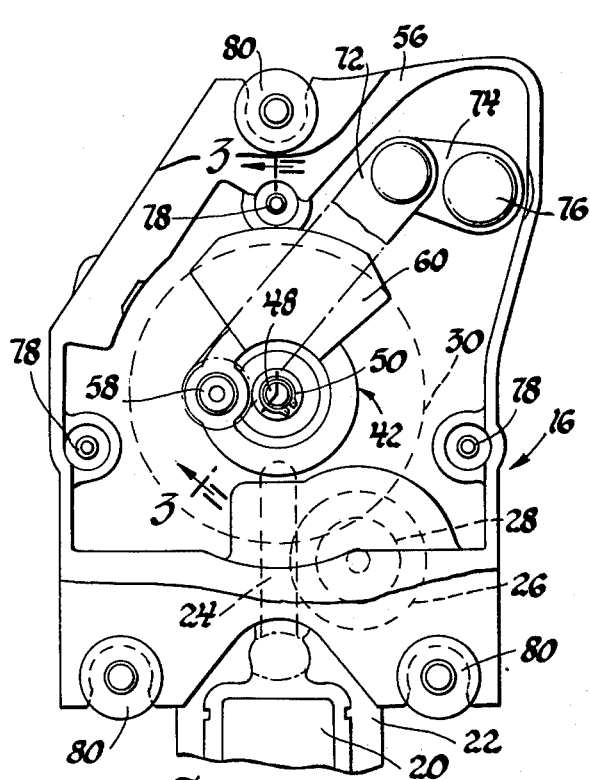
FIG. 2 is an elevational view of a portion of the windshield wiper assembly incorporating the present invention.
Figure 3:
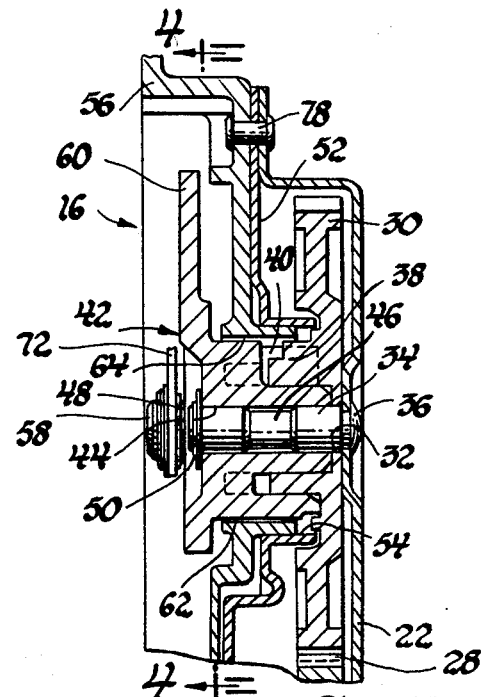
FIG. 3 is a view taken along line 3—3 of FIG. 2.
Figure 5:
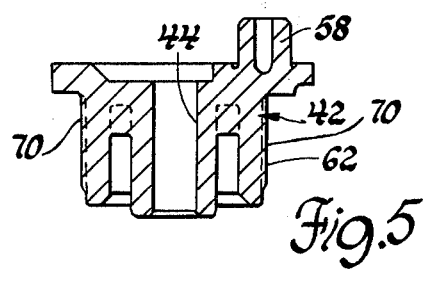
FIG. 5 is a sectional view taken along line 5—5 of FIG. 4.

Referring to the drawings, wherein like characters represent the same or corresponding parts throughout the several views, there is seen in FIG. 1 a station wagon type automobile, generally designated 10, having a rear conventional windshield or backlight 12 and a tailgate 14. The tailgate 14 has mounted therein a windshield wiper assembly 16 which includes a wiper blade 18 adapted to be oscillated through a wiping arc on the backlight 12.

The windshield wiper assembly 16 is preferably electrically controlled in a conventional manner utilizing electrical switches as is well-known with windshield wiper systems. The windshield wiper assembly 16 includes a conventional permanent magnet motor 20 which is incorporated in a sheet metal housing 22 and has a worm shaft 24 which meshes with a worm gear 26. The worm gear 26 has secured thereto a pinion gear 28 which drivingly meshes with an output drive gear 30. The output drive gear 30 has an inner diameter 32 which is rotatably supported on a pin 34 secured at end 36 in the housing 22. The gear 30 also has a pair of drive tangs 38, one of which is shown, which mesh in drive slots 40 formed in a crank arm 42.

The crank arm 42 has a central diametral or cylindrical bearing portion 44 which is rotatably supported on the pin 34. The pin 34 has a central recess portion 46 in which lubricant is stored at assembly and a grooved end 48 opposite the end 36. The end 48 cooperates with a snap ring 50, in a conventional manner, to maintain the gear 30 and crank arm 42 assembled on the pin 34.

The motor 20 and gears 26, 28 and 30 have a second housing portion 52 which cooperate with housing 22 to form a complete enclosure for the drive motor and gear assembly. There is a cylindrical opening 54 formed in the housing 52 in which there is assembled in close fit a linkage housing 56 which provides a clearance space for the upper portion of crank arm 42 which includes a crank pin 58 and a park switch cam portion 60. A conventional park switch, not shown, is operated by cam portion 60. The outer diametral surface 62 of crank arm 42 passes through cylindrical opening 64 in the housing 56. The outer surface 62 of the crank arm 42 is spaced slightly from the opening 64 and has formed therein a plurality of recesses 66 which are filled with lubricant at assembly.

Figure 4:
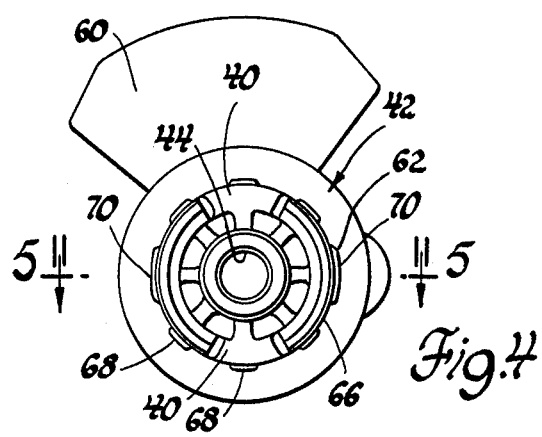
FIG. 4 is a view taken along line 4—4 of FIG. 3 showing an end view of the crank arm.

As can best be seen in FIG. 4, the outer surface 62 is comprised of a plurality of equal axially extending peripheral bearing surfaces 68 and two larger axially extending peripheral bearing surfaces 70. These peripheral surfaces 70 are 180° apart and axially aligned with the crank pin 58. This arrangement permits larger bearing surfaces to be aligned with the maximum reaction forces on the crank pin 58 while simultaneously maintaining the advantage of lubricant pockets on the outer surface of crank arm 42.

A link bar 72 is pivotally connected between the crank pin 58 and a wiper drive arm 74. The wiper drive arm 74 is connected to a wiper drive shaft 76 which is in turn connected to drive the wiper blade 18 in a conventional manner. The housing 56 and the separately riveted combination of motor housings 52 and 22 are secured together by a plurality of rivets 78 and the housing 56 is provided with three mounting locations 80 which permit assembly to the vehicle tailgate 14 as shown.

It should also be appreciated that a cover plate will be secured to the housing 56 thereby enclosing the crank arm and linkage assembly. The use of such cover plates is well-known and it is not believed necessary to show the same.

When desired, the operator energizes the wiper mechanism 16 in a conventional manner. As is well-known, the electric motor 20 rotates causing rotation of the worm shaft 24 which results in rotation of gear 30 through intermediate gears 26 and 28. As the gear 30 rotates, the crank arm 42 is also rotated so that the windshield wiper dirve arm 74 is oscillated in a well-known manner resulting in the oscillation of wiper blade 18.

There is a considerable amount of force transmitted in wiper systems and it has been found that using the cantilever pin support is not sufficient and it becomes necessary to provide a stiffening back-up plate or washer on the housing 22 where the upset end 36 of pin 34 is riveted against housing 22. However, by utilizing the outer surface of crank arm 42 as a secondary bearing surface, it has been found that the mounting of pin 34 can be done very simply without a back-up plate, thus eliminating the cost of an additional member and a much heavier pin member. The pin used with the present invention can be secured in an opening in the sheet metal housing 22 by simply upsetting the metal in a well-known manner to secure the pin in the desired location. The housing 22 is sufficiently flexible to permit the slight deflection which occurs prior to the secondary bearing surface taking up the load without fatiguing the housing 22 in the area of pin 34. By permitting slight deflection prior to the secondary bearing surface being loaded, it is possible to use nominal diameters and reasonable tolerances for the cylindrical opening 64 and outer surface 62 which permits economical manufacture and assembly of these parts.

It should therefore be obvious to one skilled in the art, that an efficient and economical structure for use in a windshield wiper crank arm and support mechanism can be accomplished with the present invention.

The embodiments of the invention in which an exclusive property or privilege is claimed are defined as follows:

1. A windshield wiper crank arm and support for use in a windshield wiper having a geared input disposed in one housing and a linkage output disposed in a second housing secured to and covering a portion of the one housing, said crank arm and support comprising; a pin member secured in cantilever fashion to the one housing, extending through an opening in the second housing and providing a rotational axis; a gear member rotatably supported at the inner diameter thereof on said pin member; and a crank arm drivingly connected to said gear member and having an inner diametral bearing portion supported on said pin member for rotation, an outer diametral bearing portion adapted to be supported in the second housing when slight deflection of said pin occurs, and a crank pin operatively connected with the linkage output, said outer diametral bearing portion having axially extending lubricant carrying recesses.

2. A windshield wiper crank arm and support for use in a windshield wiper having a geared input disposed in one housing and a linkage output disposed in a second housing secured to and covering a portion of the one housing, said crank arm and support comprising; a pin member secured in cantilever fashion to the one housing, extending through an opening in the second housing and providing a rotational axis; a crank arm drivingly connected to said gear member and having an inner diametral bearing portion supported on said pin member for rotation, an outer diametral bearing portion adapted to be supported in the second housing when slight deflection of said pin occurs, and a crank pin operatively connected with the linkage output, said outer diametral bearing portion having axially extending lubricant carrying recesses; a gear member drivingly connected with said crank arm; and means for rotating said gear member and said crank arm.

3. A windshield wiper crank arm and support for use in a windshield wiper having a geared input disposed in one housing and a linkage output disposed in a second housing secured to and covering a portion of the one housing, said crank arm and support comprising; a pin member secured in cantilever fashion to the one housing, extending through an opening in the second housing and providing a rotational axis; a lubricant space formed on the outer periphery of said pin member; a gear member rotatably disposed about said pin member; and a crank arm drivingly connected to said gear member and having an inner cylindrical bearing portion supported on said pin member for rotation, outer peripheral bearing portions adapted to be supported in the second housing when slight deflection of said pin member occurs, and a crank pin operatively connected with the linkage output, said outer peripheral bearing portions being spaced to provide axially extending lubricant carrying recesses intermediate the peripheral bearing portions.

* * * * *